(12) United States Patent
Bodas et al.

(10) Patent No.: US 9,591,587 B2
(45) Date of Patent: Mar. 7, 2017

(54) MAXIMUM PATHLOSS MEASUREMENT FOR BROADCAST COMMUNICATION

(71) Applicant: QUALOCMM Incorporated, San Diego, CA (US)

(72) Inventors: Shreeshankar Bodas, Belle Mead, NJ (US); Saurabha Rangrao Tavildar, Jersey City, NJ (US); Sina Lashgari, Ithaca, NY (US)

(73) Assignee: QUALCOMM Incorporated, San Diego, CA (US)

(*) Notice: Subject to any disclaimer, the term of this patent is extended or adjusted under 35 U.S.C. 154(b) by 157 days.

(21) Appl. No.: 14/272,128

(22) Filed: May 7, 2014

(65) Prior Publication Data

US 2015/0327181 A1 Nov. 12, 2015

(51) Int. Cl.
*H04B 7/00* (2006.01)
*H04W 52/24* (2009.01)
*H04W 24/08* (2009.01)
*H04W 52/14* (2009.01)

(52) U.S. Cl.
CPC ......... *H04W 52/242* (2013.01); *H04W 24/08* (2013.01); *H04W 52/143* (2013.01); *H04W 52/246* (2013.01)

(58) Field of Classification Search
CPC ... H04W 24/08; H04W 24/10; H04W 52/143; H04W 52/0206; H04W 52/242; H04W 52/246; H04W 52/325; H04W 72/042; H04W 72/085; H04W 52/24; H04W 52/50; H04W 52/367; H04W 52/12; H04W 52/40

USPC ...... 455/434, 435.1, 450, 452.1, 452.2, 507, 455/517, 522; 370/328
See application file for complete search history.

(56) References Cited

U.S. PATENT DOCUMENTS

| 2010/0279686 | A1 | 11/2010 | Tokgoz et al. | |
|---|---|---|---|---|
| 2011/0319122 | A1 | 12/2011 | Zhou et al. | |
| 2012/0182921 | A1* | 7/2012 | Tsuboi | H04W 4/021 370/312 |
| 2013/0053021 | A1* | 2/2013 | Zhu | H04W 24/02 455/422.1 |

(Continued)

FOREIGN PATENT DOCUMENTS

WO WO-2004054135 A1 6/2004

OTHER PUBLICATIONS

ISA/EPO, International Search Report and Written Opinion of the International Searching Authority, Int'l Appl. No. PCT/US2015/026653, Jun. 30, 2015, European Patent Office, Rijswijk, NL, 10 pgs.

*Primary Examiner* — Nhan Le
(74) *Attorney, Agent, or Firm* — Holland & Hart LLP

(57) ABSTRACT

Methods, systems, and devices are described for determining pathloss. A transmitter may send a reference signal to receivers associated with broadcast transmissions. The receivers participating in the broadcast transmissions that receive the reference signal at a pathloss greater than a predetermined pathloss value may send a response to the reference signal. Receivers that receive the reference signal at a pathloss less than the predetermined pathloss value may not send a response. The pathloss may be determined based on whether a response is received. The transmitter may then transmit signals for the broadcast transmission at a power level determined based on the pathloss value.

18 Claims, 11 Drawing Sheets

(56) References Cited

U.S. PATENT DOCUMENTS

| | | |
|---|---|---|
| 2013/0244715 A1 | 9/2013 | Kwon et al. |
| 2013/0281143 A1 | 10/2013 | Nentwig et al. |
| 2014/0010099 A1 | 1/2014 | Chiu et al. |
| 2014/0066119 A1 | 3/2014 | Tavildar et al. |

\* cited by examiner

MAXIMUM PATHLOSS MEASUREMENT FOR BROADCAST COMMUNICATION

BACKGROUND

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

Generally, a wireless multiple-access communications system may include a number of base stations, each simultaneously supporting communication for multiple mobile devices. Base stations may communicate with mobile devices on downstream and upstream links. Each base station has a coverage range, which may be referred to as the coverage area of the cell. In a broadcast or multicast communication scenario, one transmitter is transmitting information (e.g., data and/or control information) to multiple receivers. It is advantageous to be able to conserve transmission power and other resources. In some examples, the broadcast or multicast transmitters may be mobile device-to-mobile device communications (D2D). Resource sharing decisions may be made in a distributed fashion. In order to facilitate an efficient and distributed resource sharing, it is preferable if every broadcast transmitter has information regarding the maximum pathloss to its associated receivers. Having this maximum pathloss information can help the transmitters make decisions on their transmit powers, occupied bandwidths, probabilities of channel access, etc.

SUMMARY

The described features generally relate to one or more improved systems, methods, and/or apparatuses for a transmitter (e.g., a multicast transmitter) to determine its maximum pathloss measurement for its associated receivers. Generally, the transmitter may transmit a pilot signal (e.g. a reference signal, etc.) at a fixed power level. The receivers associated with the transmitter (e.g., receivers interested in participating in the multicast transmission) may, in some examples, a priori know that if they receive the pilot signal at or below a predetermined received power level. These receivers will send information to the transmitter indicating that they received the pilot signal at or below the predetermined received power level.

Additionally or alternatively, the transmitter may also transmit information in the pilot signal indicative of the predetermined received power level the receivers should monitor. If the associated receivers do not receive the pilot signal at or below the predetermined received power level, then no signal is communicated back to the transmitter. Thus, the transmitter can determine that its maximum pathloss is at or below a predetermined level based one whether or not it receives a response from any of its associated receivers. The described features may be repeated in an iterative fashion for the transmitter to determine its maximum pathloss to within a predetermined range of accuracy, e.g., ±3 dB.

In a first set of illustrative embodiments, a method for wireless communications is described. The method may include: sending, by a transmitter, a reference signal at a first power level; determining whether a pathloss value for a receiver associated with the transmitter is greater than a first predetermined pathloss value, the determining based at least in part on whether a response to the reference signal is received from the receiver; and transmitting a signal at a transmission power based at least in part on the determining.

In some aspects, the method may include determining that the pathloss value for the receiver is lower than the first predetermined pathloss value based on a failure to receive a response from the receiver. The reference signal may include an information field associated with the first predetermined pathloss value. The method may include: modifying the information field associated with the first predetermined pathloss value based on receiving no response, wherein modifying the information field identifies a second predetermined pathloss value, the second predetermined pathloss value being lower than the first predetermined pathloss value; re-sending, by the transmitter, the reference signal at the first power level, the reference signal comprising the modified information field associated with the second predetermined pathloss value; and determining whether the pathloss value for the receiver is greater than the second predetermined pathloss value based on whether a response to the reference signal is received. The method may include repeating, iteratively, the modifying, re-sending, and determining steps until a response is received from the receiver; and determining a maximum pathloss value for the receiver based at least in part on receiving the response.

In some aspects, the method may include determining that the pathloss value for the receiver is higher than the first predetermined pathloss value based on receiving a response from the receiver. The reference signal may include an information field associated with the first predetermined pathloss value. The method may include: modifying the information field associated with the first predetermined pathloss value based on receiving the response, wherein modifying the information field identifies a second predetermined pathloss value, the second predetermined pathloss value being higher than the first predetermined pathloss value; re-sending, by the transmitter, the reference signal at the first power level, the reference signal comprising the modified information field associated with the second predetermined pathloss value; and determining whether the pathloss value for the receiver is greater than the second predetermined pathloss value based on whether a response to the reference signal is received. The method may include repeating, iteratively, the modifying, re-sending, and determining steps until no response is received from the receiver; and determining a maximum pathloss value for the receiver based at least in part on a failure to receive a response.

In some aspects, a response from the receiver indicates that the receiver received the reference signal at a received power level below a threshold power level. an absence of a response from the receiver indicates that the receiver received the reference signal at a received power level above a threshold power level. a response from the receiver may be received via a channel common to all receivers associated with the transmitter. The method may include determining a maximum pathloss for the receiver by iteratively repeating the sending and determining steps.

In a second set of illustrative embodiments, an apparatus for wireless communications is described. The apparatus may include a processor, memory in electronic communication with the processor, and instructions stored in the memory, the instructions being executable by the processor. The instructions may be executable to: send, by a transmitter, a reference signal at a first power level; determine whether a pathloss value for a receiver associated with the transmitter is greater than a first predetermined pathloss value, the determining based at least in part on whether a response to the reference signal is received from the receiver; and transmit a signal at a transmission power based at least in part on the determining.

In some aspects, the apparatus may include instructions executable by the processor to determine that the pathloss value for the receiver is lower than the first predetermined pathloss value based on a failure to receive a response from the receiver. The reference signal may include an information field associated with the first predetermined pathloss value. The apparatus may include instructions executable by the processor to: modify the information field associated with the first predetermined pathloss value based on receiving no response, wherein modifying the information field identifies a second predetermined pathloss value, the second predetermined pathloss value being lower than the first predetermined pathloss value; re-send, by the transmitter, the reference signal at the first power level, the reference signal comprising the modified information field associated with the second predetermined pathloss value; and determine whether the pathloss value for the receiver is greater than the second predetermined pathloss value based on whether a response to the reference signal is received. The instructions may be executable by the processor to repeat, iteratively, the modifying, re-sending, and determining steps until a response is received from the receiver; and determine a maximum pathloss value for the receiver based at least in part on receiving the response.

In some aspects, the apparatus may include instructions executable by the processor to determine that the pathloss value for the receiver is higher than the first predetermined pathloss value based on receiving a response from the receiver. The reference signal may include an information field associated with the first predetermined pathloss value. The instructions may be executable by the processor to: modify the information field associated with the first predetermined pathloss value based on receiving the response, wherein modifying the information field identifies a second predetermined pathloss value, the second predetermined pathloss value being lower than the first predetermined pathloss value; re-send, by the transmitter, the reference signal at the first power level, the reference signal comprising the modified information field associated with the second predetermined pathloss value; and determine whether the pathloss value for the receiver is greater than the second predetermined pathloss value based on whether a response to the reference signal is received. The instructions may be executable by the processor to repeat, iteratively, the modifying, re-sending, and determining steps until no response is received from the receiver; and determine a maximum pathloss value for the receiver based at least in part on a failure to receive a response.

In some aspects, the instructions may be executable by the processor to determine a maximum pathloss for the receiver by iteratively repeating the sending and determining steps.

In a third set of illustrative embodiments, an apparatus for wireless communications is described. The apparatus may include: means for sending, by a transmitter, a reference signal at a first power level; means for determining whether a pathloss value for a receiver associated with the transmitter is greater than a first predetermined pathloss value, the determining based at least in part on whether a response to the reference signal is received from the receiver; and means for transmitting a signal at a transmission power based at least in part on the determining.

In some aspects, the apparatus may include means for determining that the pathloss value for the receiver is lower than the first predetermined pathloss value based on a failure to receive a response from the receiver. The reference signal may include an information field associated with the first predetermined pathloss value. The apparatus may include: means for modifying the information field associated with the first predetermined pathloss value based on receiving no response, wherein modifying the information field identifies a second predetermined pathloss value, the second predetermined pathloss value being lower than the first predetermined pathloss value; means for re-sending, by the transmitter, the reference signal at the first power level, the reference signal comprising the modified information field associated with the second predetermined pathloss value; and means for determining whether the pathloss value for the receiver is greater than the second predetermined pathloss value based on whether a response to the reference signal is received. The apparatus may include: means for repeating, iteratively, the modifying, re-sending, and determining steps until a response is received from the receiver; and means for determining a maximum pathloss value for the receiver based at least in part on receiving the response.

In some aspects, the apparatus may include: means for modifying the information field associated with the first predetermined pathloss value based on receiving the response, wherein modifying the information field identifies a second predetermined pathloss value, the second predetermined pathloss value being lower than the first predetermined pathloss value; means for re-sending, by the transmitter, the reference signal at the first power level, the reference signal comprising the modified information field associated with the second predetermined pathloss value; and means for determining whether the pathloss value for the receiver is greater than the second predetermined pathloss value based on whether a response to the reference signal is received.

In a fourth set of illustrative embodiments, a computer program product for wireless communications is described. The computer program product may include a non-transitory computer-readable medium storing instructions executable by a processor. The instructions may be executable by the processor to: send, by a transmitter, a reference signal at a first power level; determine whether a pathloss value for a receiver associated with the transmitter is greater than a first predetermined pathloss value, the determining based at least in part on whether a response to the reference signal is received from the receiver; and transmit a signal at a transmission power based at least in part on the determining.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In a unicast scenario (transmission where a transmitter communicates with only one receiver), the pathloss is typically calculated by means of dedicated control channel(s) for measuring CQI (channel quality information) and the like. An application of this unicast pathloss determination procedure for the broadcast scenario is for every receiver to utilize a channel to determine the pathloss (e.g., CQI) and then report the associated pathloss back to the transmitter. For the case where there are many receivers, this may require large overhead resources for pathloss reporting by each receiver. This extension to the broadcast scenario requires substantially more processing by the transmitter, i.e., receiving and processing a response from every receiver. Moreover, each receiver reporting its individual pathloss increases transmissions which may lead to increased interference, and the like. Therefore, it is preferable for a transmitter to be able to determine the maximum pathloss for its associated receivers to improve the transmitters determination of its transmit power, bandwidth, and the like.

The described techniques and apparatuses enable a transmitter to determine its maximum pathloss for its associated receivers without the aforementioned problems. The transmitter may transmit a reference signal (e.g. pilot) at a fixed power level. The receivers associated with the transmitter may, in some examples, know that if they receive the reference signal at or below a predetermined received power level (i.e., indicating that their pathloss is greater than a predetermined pathloss value), the receivers will send information to the transmitter indicating that they received the pilot signal at or below the predetermined received power level. Additionally or alternatively, the transmitter may also transmit information in the pilot signal indicative of the predetermined received power level for the receivers to monitor for. If the associated receivers do not receive the pilot signal at or below the predetermined received power level, then no response is sent back to the transmitter. Thus, the transmitter can determine that its maximum pathloss is at or below a predetermined level based one whether or not it receives a response from any of its associated receivers.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Figure 1:
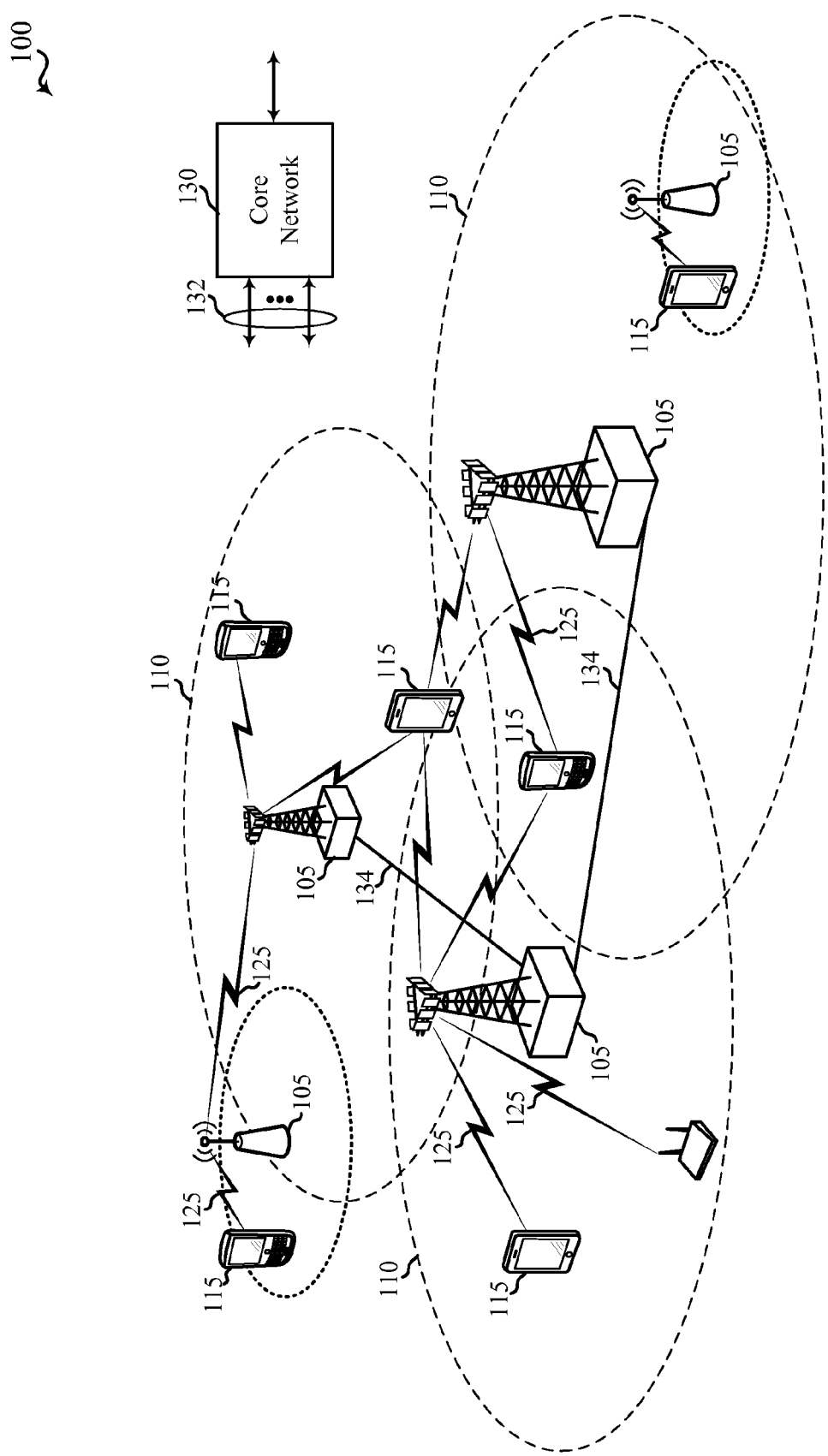
FIG. 1 shows a block diagram of multiple wireless communications systems, in accordance with various aspects of the present disclosure.

Referring first to FIG. 1, a diagram illustrates an example of a wireless communication system 100. The system 100 includes base stations (or cells or nodes) 105, user equipments (UEs) 115, and a core network 130. For the purposes of the present disclosure, the terms "cell," "base station," and "eNB" are used interchangeably. For the purposes of the present disclosure, the terms "UE" and "mobile device" are used interchangeably.

The base stations 105 may communicate with the UEs 115 under the control of a base station controller (not shown), which may be part of the core network 130 or the base stations 105 in various embodiments. Base stations 105 may communicate control information and/or user data with the core network 130 through backhaul 132. In certain embodiments, the base stations 105 may communicate, either directly or indirectly, with each other over backhaul links 134, which may be wired or wireless communication links. The system 100 may support operation on multiple carriers (waveform signals of different frequencies). Multi-carrier transmitters can transmit modulated signals simultaneously on the multiple carriers. For example, each communications link 125 may be a multi-carrier signal modulated according to the various radio technologies described above. Each modulated signal may be sent on a different carrier and may carry control information (e.g., reference signals, control channels, etc.), overhead information, data, etc.

The base stations 105 may wirelessly communicate with the UEs 115 via one or more base station antennas. Each of the base stations 105 may provide communication coverage for a respective geographic coverage area 110. In some embodiments, a base station 105 may be referred to as a base transceiver station, a radio base station, an access point, a radio transceiver, a basic service set (BSS), an extended service set (ESS), a NodeB, eNodeB (eNB), a Home NodeB, a Home eNodeB, or some other suitable terminology. The coverage area 110 for a base station 105 may be divided into sectors making up only a portion of the coverage area (not shown). The system 100 may include base stations 105 of different types (e.g., macro, micro, and/or femto/pico base stations). There may be overlapping coverage areas for different technologies.

In certain embodiments, the system 100 is an LTE/LTE-A network. In LTE/LTE-A networks, the term evolved Node B (eNB) may be generally used to describe one or more of the base stations 105. The system 100 may be a Heterogeneous LTE/LTE-A network in which different types of eNBs provide coverage for various geographical regions. For example, each base station 105 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the base stations 105 via a backhaul 132 (e.g., S1, etc.). The base stations 105 may also communicate with one another, e.g., directly or indirectly via backhaul links 134 (e.g., X2, etc.) and/or via backhaul 132 (e.g., through core network 130). The wireless communication system 100 may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

The communications links 125 shown in the wireless communication system 100 may include uplink (UL) transmissions from a UE 115 to a base station 105, and/or downlink (DL) transmissions from a base station 105 to a UE 115. The downlink transmissions may also be called forward link transmissions while the uplink transmissions may also be called reverse link transmissions.

The UEs 115 are dispersed throughout the wireless communication system 100 and each UE 115 may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE 115 may be able to communicate with macro eNBs, pico eNBs, femto eNBs, relays, and the like.

A UE 115 and/or a eNB 105 may be configured as a transmitter in a broadcast or multicast scenario. The UE 115 and/or the eNB 105 may transmit information to other UEs 115 and/or eNBs 105 configured to act as receivers in the broadcast scenario. The transmitter may determine its maximum pathloss for its associated receivers. In some aspects, the transmitter may send a reference signal to the receivers participating in the broadcast scenario. The reference signal may be sent at a fixed or known power level. The receivers may measure the received power level of the reference signal. The received power level of the reference signal may be an indication of the pathloss value between the receiver and the transmitter. The receivers that receive the reference signal at a received power level below a predetermined receive power level (i.e., having a higher pathloss value) may send a response to the transmitter. Receivers that receive the reference signal at a received power level greater than the predetermined receiver power level (i.e., having a lower pathloss value) may not respond to the reference signal. The transmitter may determine that the pathloss value is greater or less than a known pathloss value based on whether any responses are received.

Figure 2:
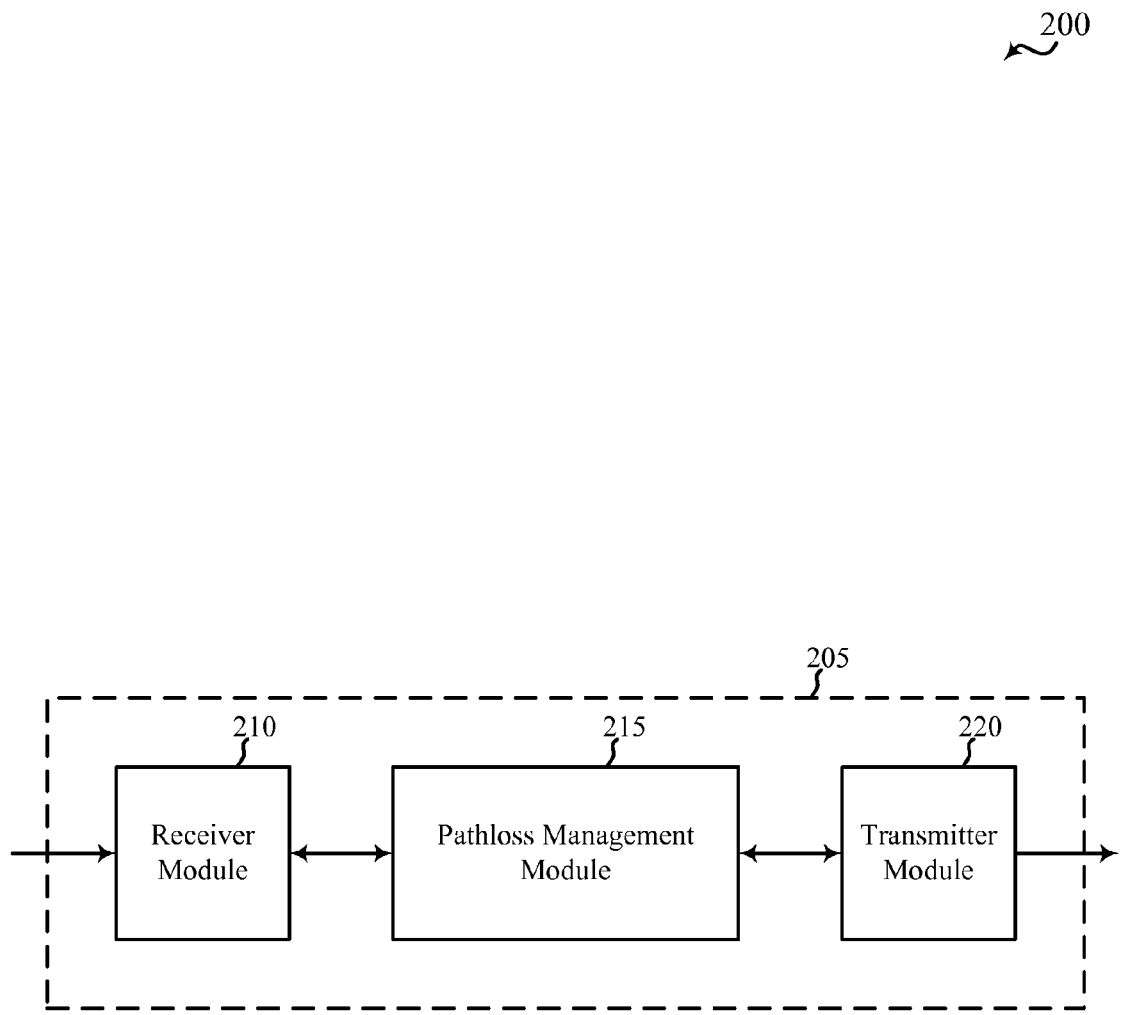
FIG. 2 shows a block diagram of a wireless device for determining maximum pathloss in a wireless communication system, in accordance with various aspects of the present disclosure.

FIG. 2 shows a block diagram 200 of a wireless device 205 for determining maximum pathloss in a broadcast scenario of a wireless communications system, in accordance with various aspects of the present disclosure. In some embodiments, the wireless device 205 may be an example of one or more aspects of the UEs 115 described with reference to FIG. 1. In other embodiments, the wireless device 205 may be an example of the eNB 105 described with reference to FIG. 1 The wireless device 205 may also be a processor. Generally, the wireless device 205 may be configured to conduct broadcast transmissions in a multicast scenario. The wireless device 205 may include a receiver module 210, a pathloss management module 215, and/or a transmitter module 220. Each of these components may be in communication with each other.

The components of the wireless device 205 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In some embodiments, the receiver module 210 may be, or include, a wireless receiver, such as a cellular receiver and/or a wireless local area network (WLAN) receiver. The receiver module 210 may also include more than one wireless receiver. The receiver module 210 may be used to receive various types of data and/or control signals (i.e., transmissions) over one or more communication links (e.g., channels) of one or more wireless communication systems, such as one or more communication links 125 of the wireless communication systems 100 described with reference to FIG. 1.

In some embodiments, the transmitter module 220 may be, or include, a wireless transmitter, such as a cellular transmitter and/or a WLAN transmitter. The transmitter module 220 may also include more than one wireless transmitter. The transmitter module 220 may be used to transmit various types of data and/or control signals (i.e., transmissions) over one or more communication links (e.g., channels) of one or more wireless communication systems, such as one or more communication links 125 of the wireless communication systems 100 described with reference to FIG. 1.

In some embodiments, the pathloss management module 215 may be used to manage pathloss determination and management for wireless communications of the wireless device 205. In some cases, the management of pathloss determination may include determining a maximum pathloss for at least one receiver associated with the wireless device 205. The pathloss management module 215 may communicate with the transmitter module 220 to send a reference signal (e.g., a pilot signal) to receivers of wireless devices participating in a broadcast communications scenario. The reference signal may be sent at a fixed or known power level. The pathloss management module 215 may communicate with the receiver module 210 to determine whether a response to the reference signal is received from one or more of the receivers. Based on whether a response is received, the pathloss management module 215 may determine whether a pathloss value for a receiver is greater than a predetermined pathloss value.

As can be appreciated, the receivers associated with the wireless device 205 may be spaced at various locations within the coverage area of the wireless device 205. As such, each receiver may experience different pathloss values such that the reference signal arrives at each receiver at different received power levels. The receivers may be configured such that if the reference signal arrives at a received power level lower than a predetermined level (i.e., that the receiver has a pathloss value greater than the predetermined pathloss value), the receiver will send a response to the reference signal to the wireless device 205. Receivers receiving the reference signal at a received power level above the predetermined level know that no response is needed since their pathloss value is below the predetermined value. As a result, the pathloss management module 215 may determine whether a pathloss value for any of the receivers, or one of the receivers, is greater than the predetermined pathloss value. The pathloss management module 215 may communicate with the transmitter module 220 to transmit a signal (data and/or control information) at a transmission power based at least in part on the determined pathloss value.

In some embodiments, the wireless device 205 may be configured to act as a receiver participating in a broadcast transmission scenario. Accordingly, the pathloss management module 215 may be configured to determine whether to send a response to a transmitter based on the received power level of a reference signal transmitted by the transmitter.

Figure 3:
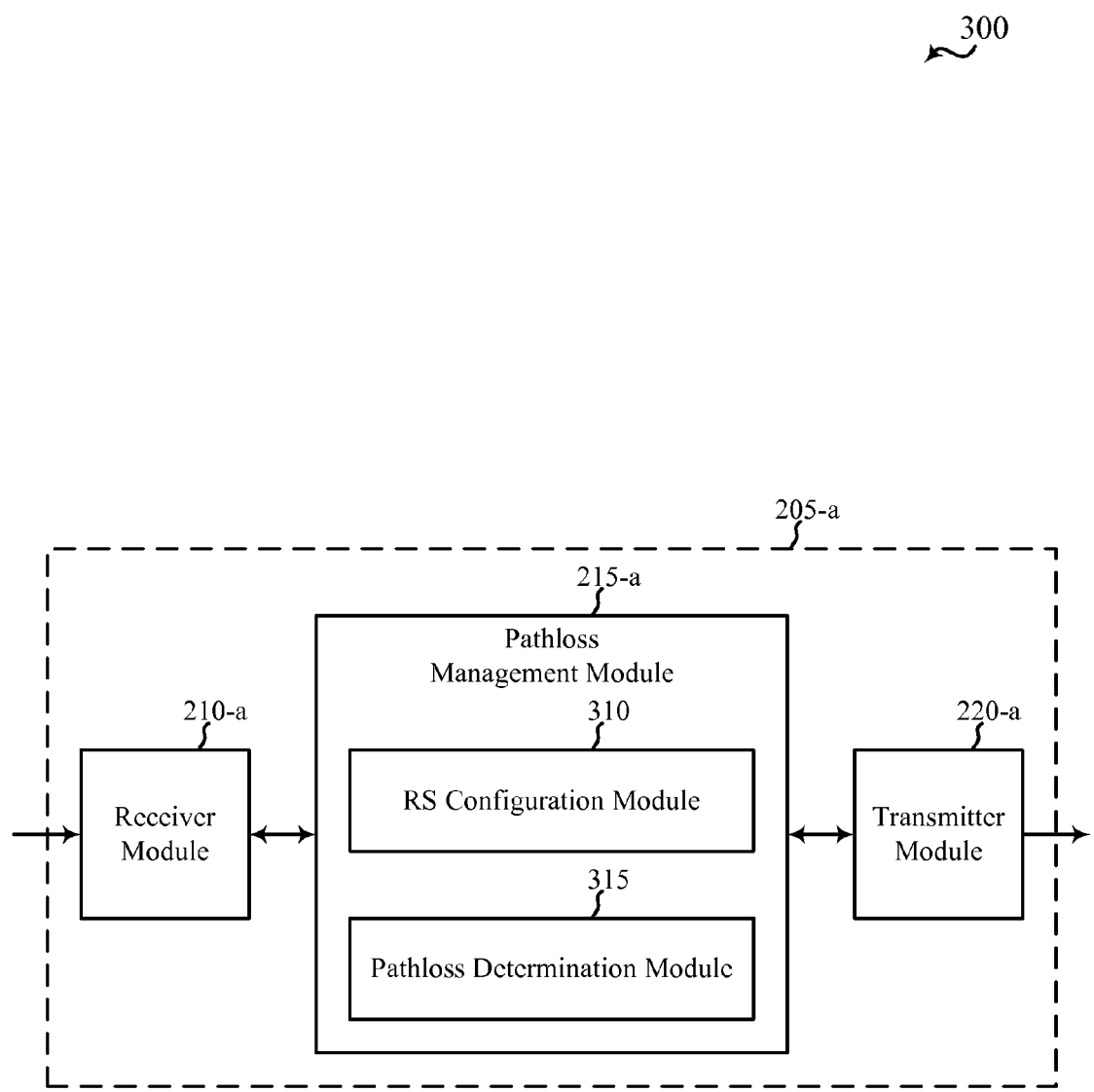
FIG. 3 shows a block diagram of a wireless device for determining maximum pathloss in a wireless communication system, in accordance with various aspects of the present disclosure.

FIG. 3 shows a block diagram 300 of a wireless device 205-*a* for determining maximum pathloss in a broadcast scenario of a wireless communications system, in accordance with various aspects of the present disclosure. In some embodiments, the wireless device 205-*a* may be an example of one or more aspects of the UEs 115 described with reference to FIG. 1. In other embodiments, the wireless device 205-*a* may be an example of the eNB 105 described with reference to FIG. 1 The wireless device 205-*a* may also be a processor. Generally, the wireless device 205-*a* may be configured to conduct broadcast transmissions in a multicast scenario. The wireless device 205-*a* may include a receiver module 210-*a*, a pathloss management module 215-*a*, and/or a transmitter module 220-*a*. Each of these components may be in communication with each other.

The components of the wireless device 205-*a* may, individually or collectively, be implemented using one or more ASICs adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some embodiments, the receiver module 210-*a* and the transmitter module 220-*a* may be configured similarly to the receiver module 210 and the transmitter module 230 described with reference to FIG. 2.

In some embodiments, the pathloss management module 215-*a* may be an example of the pathloss management module 215 described with reference to FIG. 2 and may include a reference signal configuration module 310 and/or a pathloss determination module 315. Each of these components may be in communication with each other.

The reference signal configuration module 310 may be used to configure a reference signal to be transmitted to receivers participating in the broadcast transmissions from the wireless device 205-*a*. The reference signal configuration module 310 may configure the reference signal to have a fixed or known transmission power level and to be transmitted to all receivers participating in the broadcast transmissions. In some examples, the wireless device 205-*a* may determine whether at least one receiver of its associated receivers is experiencing a pathloss value more than a given threshold. The reference signal configuration module 310 may send the reference signal (e.g., a pilot signal) at a known power level such that receivers receiving the reference signal at or below a known received power level may respond. In some embodiments, the reference signal configuration module 310 may also be configured to include one or more information fields in the reference signal indicative of the predetermined pathloss value, i.e., the pathloss value and/or the received power level to inform the receivers when a response is necessary.

The pathloss determination module 315 may determine the pathloss based on whether a response is received from one or more of the receivers. If no response is received, the pathloss determination module 315 may determine that the pathloss for its associated receivers is below the predetermined value. If a response is received from at least one of its associated receivers, the pathloss determination module 315 may determine that higher pathloss values are being experienced by the responding receiver.

Figure 4:
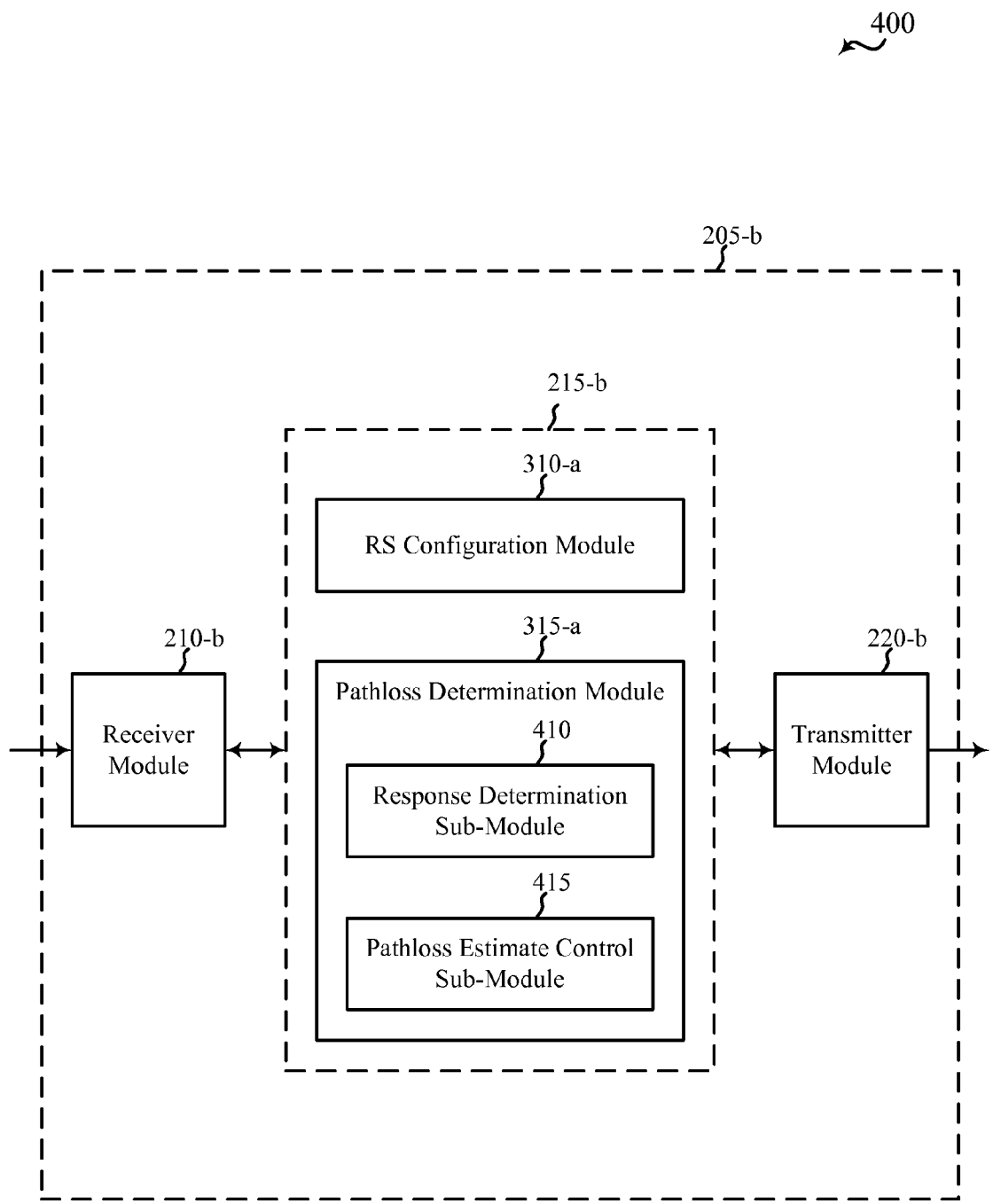
FIG. 4 shows a block diagram of a wireless device for determining maximum pathloss in a wireless communication system, in accordance with various aspects of the present disclosure.

FIG. 4 shows a block diagram 400 of a wireless device 205-*b* for determining maximum pathloss in a broadcast scenario of a wireless communications system, in accordance with various aspects of the present disclosure. In some embodiments, the wireless device 205-*b* may be an example of one or more aspects of the UEs 115 described with reference to FIG. 1. In other embodiments, the wireless device 205-*b* may be an example of the eNB 105 described with reference to FIG. 1 The wireless device 205-*b* may also be a processor. Generally, the wireless device 205-*c* may be configured to conduct broadcast transmissions in a multicast scenario. The wireless device 205-*b* may include a receiver module 210-*b*, a pathloss management module 215-*b*, and/or a transmitter module 220-*b*. Each of these components may be in communication with each other.

The components of the wireless device 205-*b* may, individually or collectively, be implemented using one or more ASICs adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some embodiments, the receiver module 210-*b* and the transmitter module 220-*b* may be configured similarly to the receiver module 210 and the transmitter module 220 described with reference to FIGS. 2 and/or 3.

In some embodiments, the pathloss management module 215-*b* may be an example of the pathloss management module 215 described with reference to FIGS. 2 and/or 3 and may include a reference signal configuration module 310-*a* and a pathloss determination module 315-*a*. Each of these components may be in communication with each other.

The reference signal configuration module 310-*a* may be used to configure a reference signal to be transmitted to receivers participating in the broadcast transmissions from the wireless device 205-*b*. The reference signal configuration module 310-*a* may configure the reference signal to have a fixed or known transmission power level and to be transmitted to all receivers participating in the broadcast transmissions. In some examples, the wireless device 205-*b* may determine whether at least one receiver of its associated receivers is experiencing a pathloss value more than a given threshold. The reference signal configuration module 310-*a* may send the reference signal (e.g., a pilot signal) at a known power level such that receivers receiving the reference signal at or below a known received power level may respond.

In some embodiments, the reference signal configuration module 310-*a* may also be configured to include one or more information fields in the reference signal indicative of the predetermined pathloss value, i.e., the pathloss value and/or the received power level to inform the receivers when a response is necessary. In an iterative embodiment, the reference signal configuration module 310-*a* may be configured to modify the information field such that a new predetermined pathloss value may identified and communicated to the receivers.

The pathloss determination module 315-*a* may be an example of the pathloss determination module 315 described above with reference to FIG. 3 and may include a response determination sub-module 410 and/or a pathloss estimate control sub-module 415. The response determination sub-module 410 may be configured to communicate with the receiver module 210-*b* to determine whether a response to the reference signal has been received. The response determination sub-module 410 may be in operative communication with the pathloss estimate control sub-module 415 and provide information indicative of whether a response has been received.

In some embodiments, the pathloss estimate control sub-module 415 may be configured to control aspects of the pathloss determination functionality of the wireless device 205-*b*. In some examples where a response is received from one or more of the receivers, the pathloss estimate control sub-module 415 may be configured to determine that the pathloss for the receiver is greater than a predetermined value. Similarly, when no response is received from any of the receiver, the pathloss estimate control sub-module 415 may be configured to determine that the pathloss for all of the receivers is less than the predetermined value.

Generally, the reference signal configuration module 310-*a* and/or the pathloss determination module 315-*a* may be configured to determine whether a pathloss value to at least one receiver participating in the broadcast transmissions is greater than a predetermined pathloss value based, at least in part, on whether a response to a reference signal is received. In some examples, the reference signal configuration module 310-*a* may be configured to send the reference signal at a fixed and/or known power level. Additionally or alternatively, the reference signal configuration module 310-*a* may be configured to include information in the reference signal (e.g., one or more information elements and/or an information field) indicative of the predetermined pathloss value.

By way of example only, the reference signal configuration module 310-*a* and/or the pathloss determination module 315-*a* may be configured to determine whether the pathloss to at least one associated receiver is greater than 100 dB. The reference signal configuration module 310-*a* may be configured to send the reference signal to the associated receivers at the known or fixed power level ($P_o$ dBm). The associated receivers may each know that if they receive the reference signal at or below a predetermined received power level ($P_o-100$ dBm), a response to the reference signal may be sent to the transmitter. The response may be sent on a channel that is common to all receivers.

The response determination sub-module 410 may determine whether a response is received or is not received from one or more of the receivers and communication information indicative of such to the pathloss estimate control sub-module 415. The pathloss estimate control sub-module 415 may determine that the pathloss to the associated receivers is at or less than 100 dB if no response is received or is greater than 100 dB is a response is received.

In some embodiments, the reference signal configuration module 310-*a* and/or the pathloss determination module 315-*a* may be configured to repeat the above-described functions in an iterative fashion to determine the maximum pathloss to the associated receivers. The iterative repetition may be repeated until the maximum pathloss is determined to within a predefined range of accuracy (e.g., ±3 dB). For example, the reference signal configuration module 310-*a* may be configured to include information in the reference signal indicative of a predetermined pathloss value (a first predetermined pathloss value). The reference signal configuration module 310-*a* may send the reference signal with the included information at a known or fixed power level. The associated receivers may receive the reference signal and read the information to determine what predetermined pathloss value is being requested. If a receiver receives the reference signal at or below a predetermined receive power level (indicating a pathloss value at or above the requested pathloss value), the receiver may send a response. Receivers receiving the reference signal above the predetermined receive power level may not send a response.

The response determination sub-module 410 may determine whether a response is received and provide information to the pathloss estimate control sub-module 415 accordingly. If no response was received, the pathloss estimate control sub-module 415 may determine that the pathloss for the associated receivers is below the predetermined pathloss value and output information to the reference signal configuration module 310-*a*. The reference signal configuration module 310-*a* may modify the information associated with the predetermined pathloss value to define a new predetermined pathloss value (a second predetermined pathloss value) that is lower than the original predetermined pathloss value. The wireless device 205-*b* may send the reference signal with the new predetermined pathloss value to the associated receivers. The pathloss determination module 315-*a* may determine whether the pathloss for the receivers is greater than the second predetermined pathloss value based on whether a response is received from at least one of the receivers.

It is to be understood that if a response was received to the reference signal with the original predetermined pathloss value, the pathloss estimate control sub-module 415 may output information to the reference signal configuration module 310-a to define a new predetermined pathloss value that is greater or higher than the first predetermined pathloss value. Accordingly, the pathloss management module 215-b may be configured to solicit responses from the associated receivers for differing predetermined pathloss values to determine the maximum pathloss values.

As one illustrative example provided for reference only, the pathloss management module 215-b may be configured to determine its maximum pathloss value to within 3 dB. Initially, the first reference signal may be sent with an information field associated with a pathloss value of 100 dBm. If no response is received, a second reference signal may be sent with an information field associated with a pathloss value of 75 dBm. If a response is received to the second reference signal, a third reference signal may be sent with an information field associated with a pathloss value of 87 dBm. If no response to the third reference signal is received, a fourth reference signal may be sent with an information field associated with 81 dBm. If a response to the fourth reference signal is received, a fifth reference signal may be sent with an information field associated with 84 dBm. If no response to the fifth reference signal is received, the pathloss management module 215-b may determine that the maximum pathloss for its associated receivers is between 81 and 84 dBm, i.e., within 3 dB. If a response to the fifth reference signal is received, the pathloss management module 215-b may determine that the maximum pathloss for its associated receivers is between 84 and 87 dBm, i.e., within 3 dB.

As a second illustrative example provided for reference only, the pathloss management module 215-b may be configured to determine its maximum pathloss value to within 3 dB. Initially, the first reference signal may be sent with an information field associated with a pathloss value of 100 dBm. If a response is received from at least one receiver, a second reference signal may sent with an information field associated with a pathloss value of 125 dBm. If no response to the second reference signal is received, a third reference signal is sent with an information field associated with a pathloss value of 113 dBm. If no response to the third reference signal is received, a fourth reference signal may be sent with an information field associated with 107 dBm. If a response to the fourth reference signal is received, a fifth reference signal may be sent with an information field associated with 110 dBm. If a response to the fifth reference signal is received, the pathloss management module 215-b may determine that the maximum pathloss for its associated receivers is between 110 and 113 dBm, i.e., within 3 dB. If no response to the fifth reference signal is received, the pathloss management module 215-b may determine that the maximum pathloss for its associated receivers is between 107 and 110 dBm, i.e., within 3 dB.

As can be appreciated from the above illustrative examples, the pathloss management module 215-b may be configured to measure the maximum pathloss to any desired level of accuracy. In some examples, the measurements for the different values of pathloss value can be spread over time, as long as the user geometry is not changing rapidly. Since the number of measurements is independent of the number of broadcast receivers and grows only logarithmically with the dynamic range of the maximum pathloss, there is minimal measurement overhead.

Figure 5:
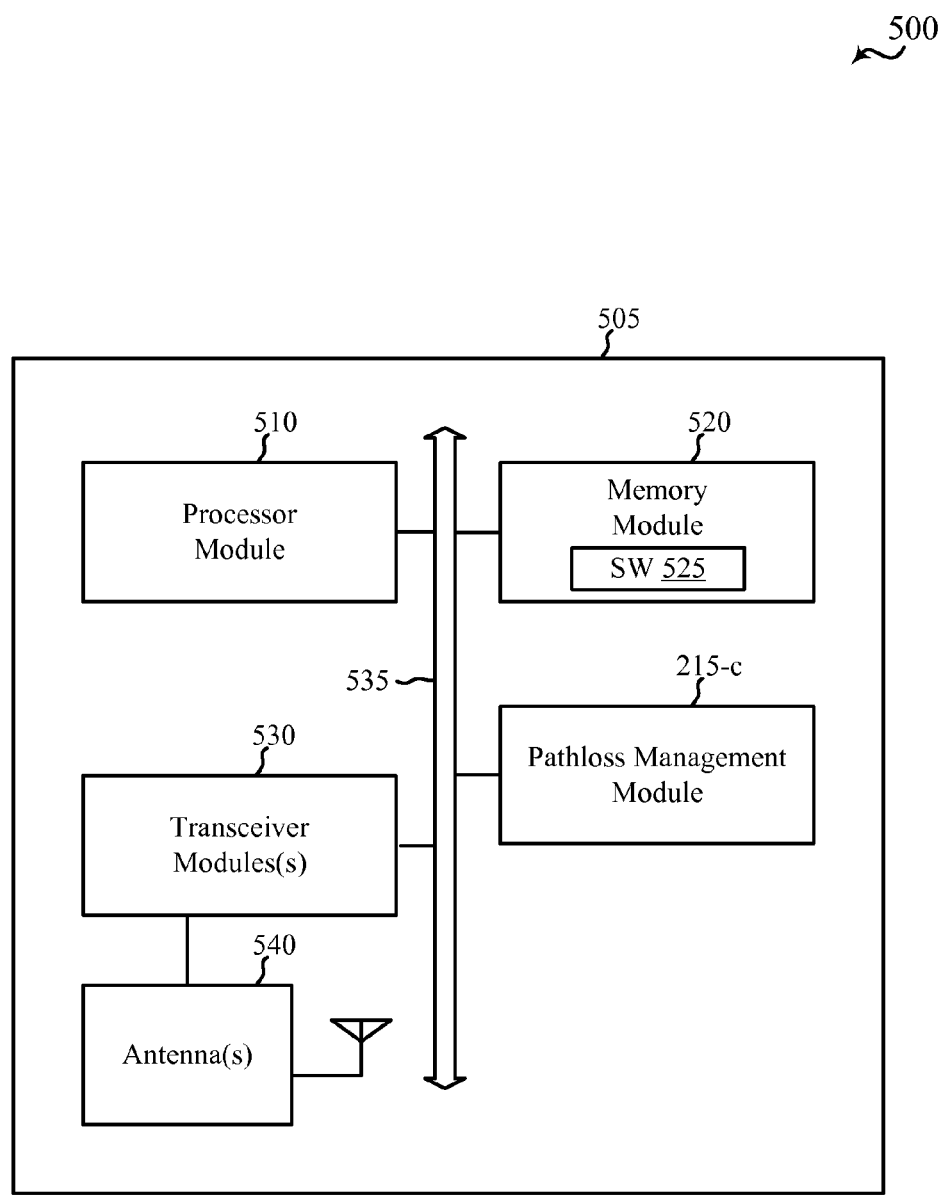
FIG. 5 shows a block diagram of a wireless device for determining maximum pathloss in a wireless communication system, in accordance with various aspects of the present disclosure.

FIG. 5 shows a block diagram 500 of an apparatus 505 for determining pathloss values, in accordance with various aspects of the present disclosure. The apparatus 505 may have various configurations and may be included or be part of a personal computer (e.g., a laptop computer, netbook computer, tablet computer, etc.), a cellular telephone, a PDA, a digital video recorder (DVR), an internet appliance, a gaming console, an e-reader, an eNB, a base station, etc. The apparatus 505 may in some cases have an internal power supply (not shown), such as a small battery, to facilitate mobile operation. In some embodiments, the apparatus 505 may be an example of one or more aspects of one of the wireless devices 115 described with reference to FIG. 1 and/or the wireless devices 205 described with reference to FIG. 2, 3, or 4. The apparatus 505 may be configured to implement at least some of the features and functions described with reference to FIGS. 1, 2, 3, and/or 4. The apparatus 505 may be configured to communicate with one or more of the eNBs 105 and/or with one or more of the UEs 115 described with reference to FIG. 1.

The apparatus 505 may include a processor module 510, a memory module 520, at least one transceiver module (represented by transceiver module(s) 530), at least one antenna (represented by antenna(s) 540), and/or a pathloss management module 215-c. Each of these components may be in communication with each other, directly or indirectly, over one or more buses 535.

The memory module 520 may include random access memory (RAM) and/or read-only memory (ROM). The memory module 520 may store computer-readable, computer-executable software (SW) code 525 containing instructions that are configured to, when executed, cause the processor module 510 to perform various functions described herein for selecting a wireless communication system. Alternatively, the software code 525 may not be directly executable by the processor module 510 but be configured to cause the apparatus 505 (e.g., when compiled and executed) to perform various of the functions described herein.

The processor module 510 may include an intelligent hardware device, e.g., a CPU, a microcontroller, an ASIC, etc. The processor module 510 may process information received through the transceiver module(s) 530 and/or information to be sent to the transceiver module(s) 530 for transmission via the antenna(s) 540. The processor module 510 may handle, alone or in connection with the pathloss management module 215-c, various aspects of selecting a wireless communication system.

The transceiver module(s) 530 may include a modem configured to modulate packets and provide the modulated packets to the antenna(s) 540 for transmission, and to demodulate packets received from the antenna(s) 540. The transceiver module(s) 530 may in some cases be implemented as one or more transmitter modules and one or more separate receiver modules. The transceiver module(s) 530 may be configured to communicate bi-directionally, via the antenna(s) 540, with one or more eNBs 105, UEs 115, or other devices. While the apparatus 505 may include a single antenna, there may be embodiments in which the apparatus 505 may include multiple antennas 540.

The pathloss management module 215-c may be configured to perform and/or control some or all of the modules described with reference to FIGS. 2, 3, and/or 4 and related to wireless communication pathloss determination for the apparatus 505. The pathloss management module 215-c, or portions of it, may include a processor, and/or some or all of the functionality of the pathloss management module 215-*c* may be performed by the processor module 510 and/or in connection with the processor module 510.

Figure 6:
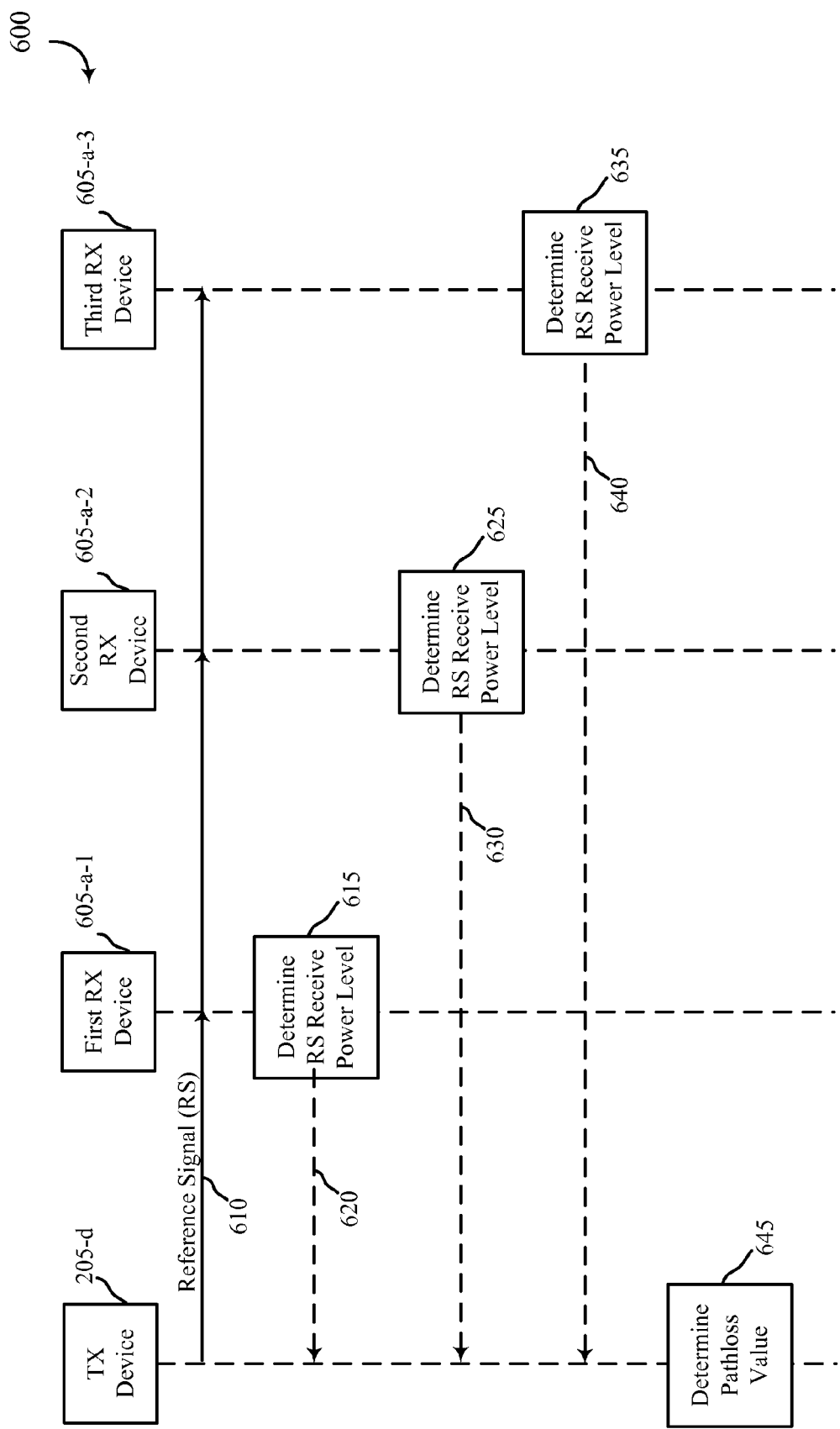
FIG. 6 shows a call flow diagram illustrating communication in a wireless communication system, according to various aspects of the present disclosure.

FIG. 6 is a call flow diagram 600 illustrating communication in a wireless communication system according to various embodiments. The diagram 600 may illustrate aspects of the system 100 described with reference to FIG. 1. The diagram 600 includes a transmitting device 205-*d* and receiving devices 605 (represented as a first receiving device 605-*a*-1, a second receiving device 605-*a*-2, and a third receiving device 605-*a*-3). Generally, the diagram 600 illustrates a broadcast transmissions scenario where the transmitting device 205-*d* sends one or more transmissions to the receiving devices 605. Each of these may be examples of UEs 115 and/or eNBs 105 described above with respect to FIG. 1. Generally, the diagram 600 illustrates the transmitting device 205-*d* determining pathloss values for the receiving devices 605.

The transmitting device 205-*d* may send a reference signal 610 to the receiving devices 605. The reference signal may be sent at a fixed or known power level. The first receiving device 605-*a*-1 may receive the reference signal and determine the received power level at 615. In some examples, the first receiving device 605-*a*-1 may measure a signal strength of the reference signal to determine the received power level and determine the pathloss value. The first receiving device 605-*a*-1 may determine the received power level in relation to the known power level of the reference signal and calculate the pathloss based on the difference. If the pathloss value is greater than a predetermined value, the first receiving device 605-*a*-1 may send a response 620 to the reference signal to the transmitting device 205-*d*.

Similarly, the second receiving device 605-*a*-2 may determine the reference signal receive power level 625 and, if the pathloss is greater than the predetermined value, send a response 630 to the reference signal to the transmitting device 205-*d*. The third receiving device 605-*a*-3 may determine the reference signal receive power level 635 and, if the pathloss is greater than the predetermined value, send a response 640 to the reference signal to the transmitting device 205-*d*.

At 645, the transmitting device 205-*d* may determine a pathloss value based on whether a response is received from one or more of the receiving devices 605. If no response was received, the transmitting device 205-*d* may determine that the pathloss value is below or less than a predetermined pathloss value. If a response was received, the transmitting device 205-*d* may determine that the pathloss value is above or greater than the predetermined pathloss value.

Figure 7:
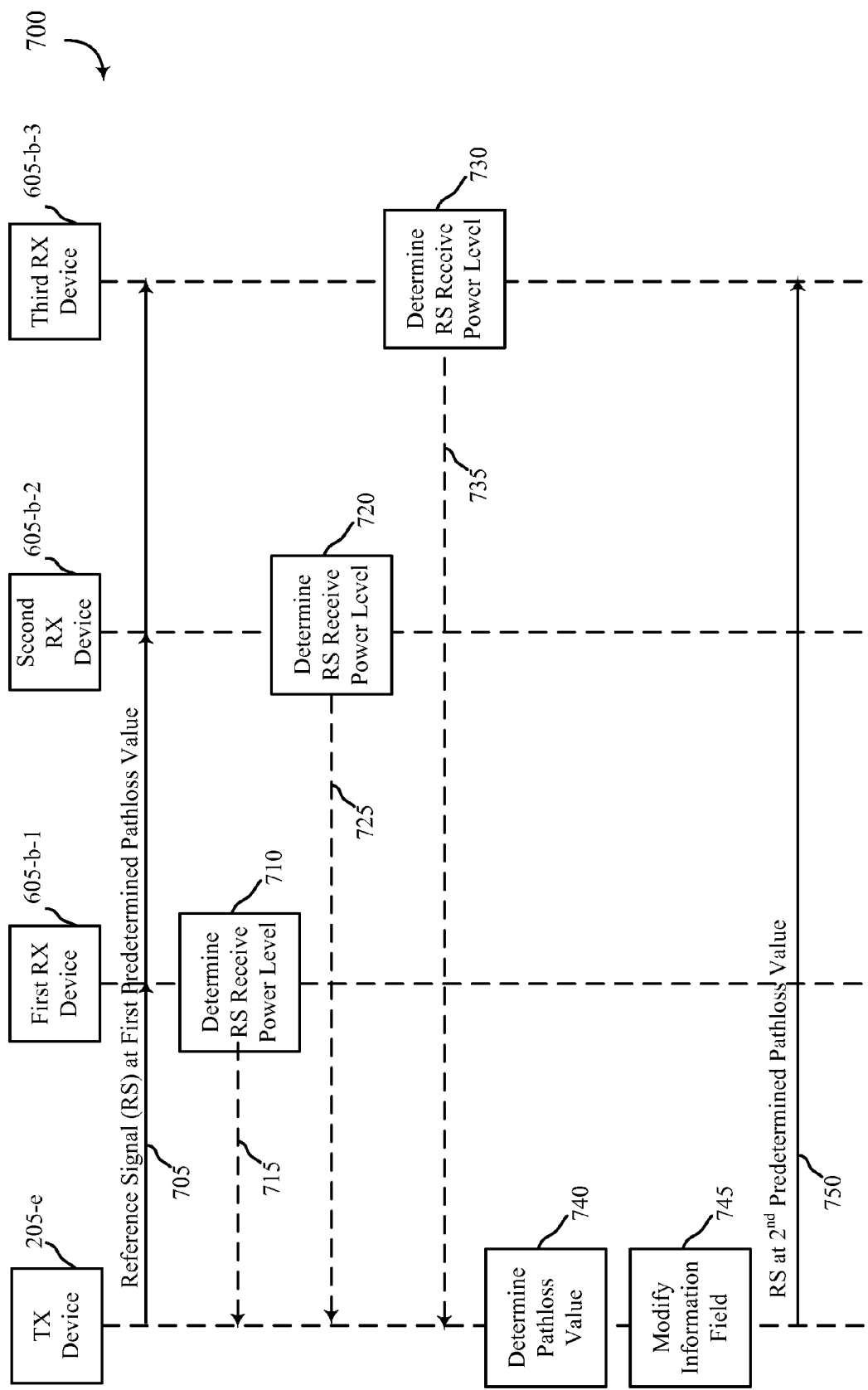
FIG. 7 shows a call flow diagram illustrating communication in a wireless communication system according to various aspects of the present disclosure.

FIG. 7 is a call flow diagram 700 illustrating communication in a wireless communication system according to various embodiments. The diagram 700 may illustrate aspects of the system 100 described with reference to FIG. 1. The diagram 700 includes a transmitting device 205-*e* and one or more receiving devices 605 (three being shown by way of example and represented as first receiving device 605-*b*-1, second receiving device 605-*b*-2, and third receiving device 605-*b*-3). Generally, the diagram 700 illustrates a broadcast transmissions scenario where the transmitting device 205-*e* sends one or more transmissions to the receiving devices 605. Each of these may be examples of UEs 115 and/or eNBs 105 described above with respect to FIG. 1. Generally, the diagram 700 illustrates the transmitting device 205-*e* determining pathloss values for the receiving devices 605.

The transmitting device 205-*e* may send a reference signal 705 to the receiving devices 605. The reference signal may include information associated with a first predetermined pathloss value. The first predetermined pathloss value may be a threshold value the transmitting device 205-*e* seeks to determine whether the pathloss for the receiver devices 605 exceeds. The reference signal may be sent at a fixed or known power level. The first receiving device 605-*b*-1 may receive the reference signal and determined the received power level at 710. In some examples, the first receiving device 605-*b*-1 may measure a signal strength of the reference signal to determine the received power level and determine the pathloss value. The first receiving device 605-*b*-1 may determine the received power level in relation to the known power level of the reference signal and calculate the pathloss value based on the difference. If the pathloss value is greater than the first predetermined pathloss value, the first receiving device 605-*b*-1 may send a response 715 to the reference signal to the transmitting device 205-*e*.

Similarly, the second receiving device 605-*b*-2 may determine the reference signal receive power level 720 and, if the pathloss is greater than the first predetermined pathloss value, send a response 725 to the reference signal to the transmitting device 205-*e*. The third receiving device 605-*b*-3 may determine the reference signal receive power level 730 and, if the pathloss is greater than the first predetermined pathloss value, send a response 735 to the reference signal to the transmitting device 205-*e*.

At 740, the transmitting device 205-*e* may determine a pathloss value based on whether a response is received from one or more of the receiving devices 605. At 745, the transmitting device 205-*e* may modify the information field associated with the first predetermined pathloss value to define a second predetermined pathloss value. The second predetermined pathloss value may be lower than the first predetermined pathloss value if no response was received or greater than the first predetermined pathloss value if a response had been received. At 750, the transmitting device 205-*e* may send the reference signal again with the second predetermined pathloss value. The receiving devices 605 may respond (not shown) if the pathloss is greater than the second predetermined pathloss value or not respond if the pathloss is less than the predetermined pathloss value.

Figure 8:
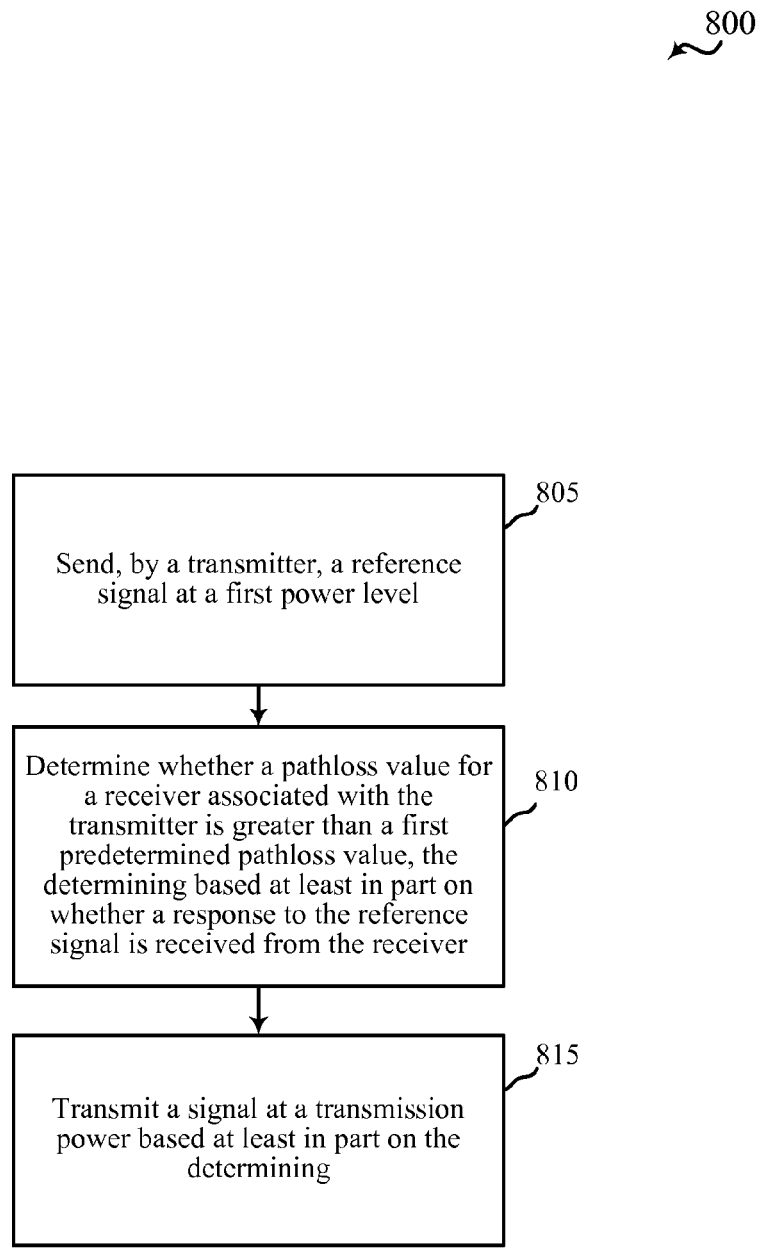
FIGS. 8-11 show flowchart diagrams of illustrative methods for wireless communications, according to various aspects of the present disclosure.

FIG. 8 is a flow chart illustrating an example of a method 800 for determining pathloss in a wireless communication system, in accordance with various aspects of the present disclosure. For clarity, the method 800 is described below with reference to aspects of one or more of the UEs 115, the devices 205, and/or the apparatus 505 described with reference to FIGS. 1, 2, 3, 4, 5, 6, and/or 7. In some embodiments, a UE such as one of the UEs 115 may execute one or more sets of codes to control the functional elements to perform the functions described below. In other embodiments, a eNB such as one of the eNBs 105 may execute one or more sets of code to control the functional elements to perform the functions described below.

At block 805, a transmitter sends a reference signal at a first power level. The operation(s) at block 805 may be performed by the pathloss management module 215 described with reference to FIGS. 2, 3, 4, and/or 5.

The reference signal may be sent at a power level that is known by the devices participating in the broadcast transmissions, i.e., the receiving devices 605. The reference signal may be a pilot signal. At block 810, it is determined whether a pathloss value for a receiver associated with the transmitter is greater than a first predetermined pathloss value, the determining based at least in part on whether a response to the reference signal is received from the receiver. In some cases, a receiver will send a response to the reference signal if the reference signal is received at a received power level at or below a predetermined power level. The receiver may, based on the known transmit power of the reference signal and the measured received power level of the reference signal, determine its pathloss. The receiver may send a response if its pathloss is above a predetermined pathloss value. If, however, the received power level is above the predetermined level and/or the pathloss value is less than the predetermined pathloss value, the receiver may send no response.

At block 815, a signal may be transmitted at a transmission power based at least in part on the determining. The transmission power may be selected to be sufficient to ensure the receivers can receive and process the signal but not so high as to cause interference.

Thus, the method 800 may provide for determining pathloss for a receiver. It should be noted that the method 800 is just one implementation and that the operations of the method 800 may be rearranged or otherwise modified such that other implementations are possible. In some examples, the operations at blocks 805, 810, and 815 may be performed by the pathloss management module 215 described with reference to FIGS. 2, 3, 4, and/or 5.

Figure 9:
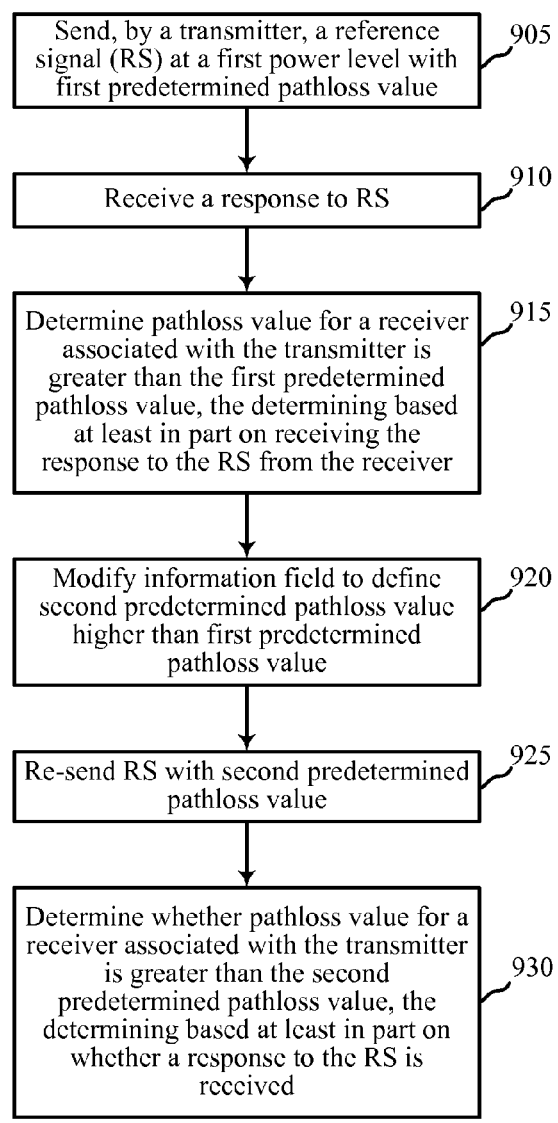

FIG. 9 is a flow chart illustrating an example of a method 900 for determining pathloss in a wireless communication system, in accordance with various aspects of the present disclosure. For clarity, the method 900 is described below with reference to aspects of one or more of the UEs 115, the devices 205, and/or the apparatus 505 described with reference to FIGS. 1, 2, 3, 4, 5, 6, and/or 7. In some embodiments, a UE such as one of the UEs 115 may execute one or more sets of codes to control the functional elements to perform the functions described below. In other embodiments, a eNB such as one of the eNBs 105 may execute one or more sets of code to control the functional elements to perform the functions described below.

At block 905, a transmitter sends a reference signal at a first power level and with a first predetermined pathloss value. The reference signal may be sent at a power level that is known by the devices participating in the broadcast transmissions, i.e., the receiving devices 605. The reference signal may be a pilot signal. The first predetermined pathloss value may be included in an information field, for example, and may provide information to the associated receivers to send a response to the reference signal if its pathloss value is greater than the first predetermined pathloss value. In some examples, the first predetermined pathloss value may be associated with a measured power level the receiver receives the reference signal at whereas the receiver may send a response if the received power level is at or below the first predetermined power level.

At block 910, a response to the reference signal is received. At block 915, it is determined that a pathloss value for a receiver associated with the transmitter is greater than a first predetermined pathloss value, the determining based at least in part on receiving the response to the reference signal from the receiver. Receiving the response may indicate that at least one receiver participating in the broadcast transmissions is experiencing a pathloss value greater than the first predetermined pathloss value. In some cases, a receiver will send a response to the reference signal if the reference signal is received at a received power level at or below a predetermined power level.

At block 920, an information field is modified to define a second predetermined pathloss value that is higher than the first predetermined pathloss value. Defining the second predetermined pathloss value may permit a more accurate determination of what the pathloss value is. For example, if the first predetermined pathloss value was 100 dBm, and the response indicates that at least one receiver is experiencing pathloss greater than 100 dBm, then the second predetermined pathloss value may be selected to be 125 dBm to ascertain whether the pathloss is between 100 dBm and 125 dBm. As such, a more narrow accuracy range of pathloss can be determined.

At block 925, the reference signal is re-sent with the second predetermined pathloss value. The reference signal can be re-sent at the same fixed or known power level as the first transmission. At block 930, it is determined whether pathloss value for a receiver associated with the transmitter is greater than the second predetermined pathloss value, the determining based at least in part on whether a response to the reference signal is received. Continuing with the example, if a receiver is experiencing pathloss greater than 125 dBm, the receiver may send a response to the reference signal. If no receiver is experiencing pathloss greater than 125 dBm, then no response to the reference signal is sent.

Thus, the method 900 may provide for determining pathloss for a receiver. It should be noted that the method 900 is just one implementation and that the operations of the method 900 may be rearranged or otherwise modified such that other implementations are possible. In some examples, the operations at blocks 905, 910, 915, 920, 925 and 930 may be performed by the pathloss management module 215 described with reference to FIGS. 2, 3, 4, and/or 5.

Figure 10:
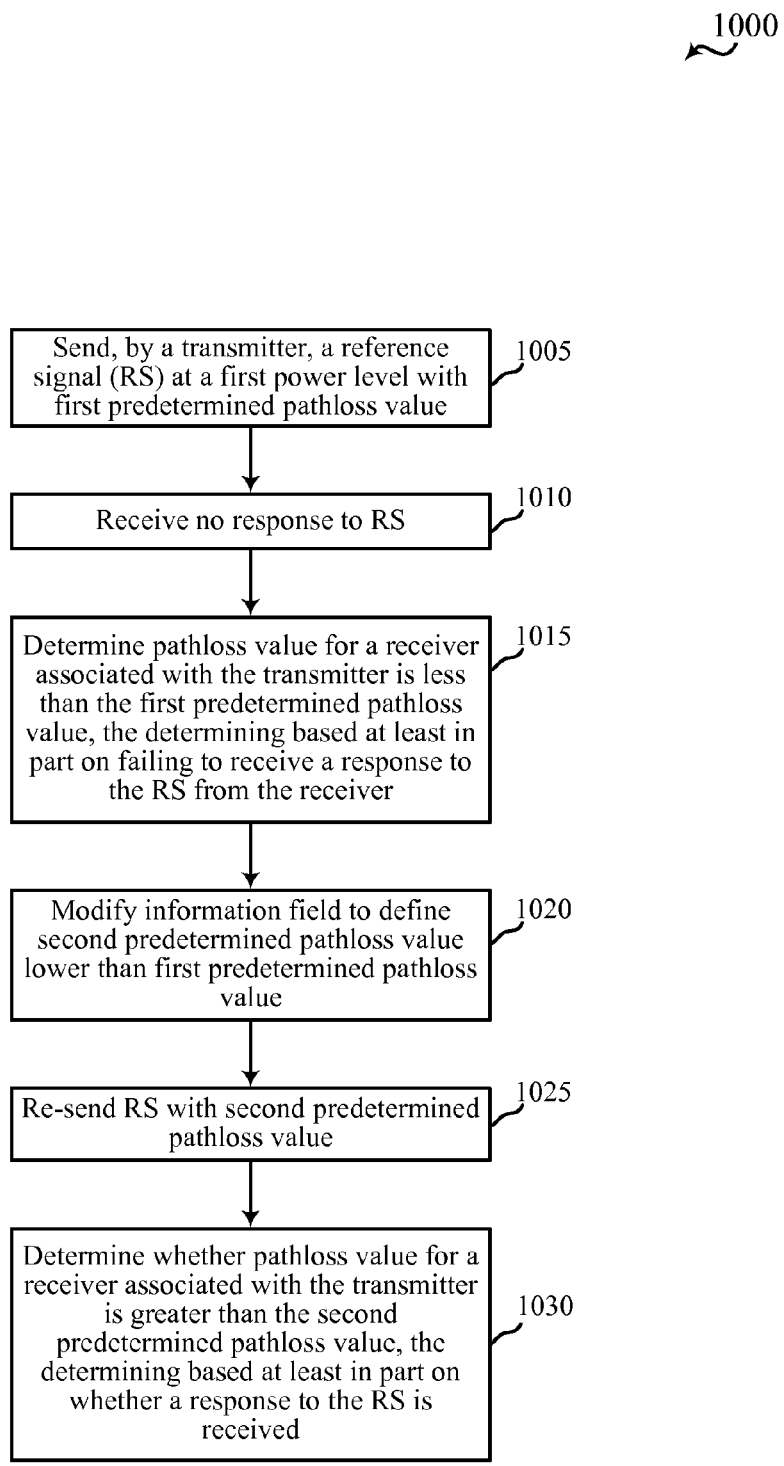

FIG. 10 is a flow chart illustrating an example of a method 1000 for determining pathloss in a wireless communication system, in accordance with various aspects of the present disclosure. For clarity, the method 1000 is described below with reference to aspects of one or more of the UEs 115, the devices 205, and/or the apparatus 505 described with reference to FIGS. 1, 2, 3, 4, 5, 6, and/or 7. In some embodiments, a UE such as one of the UEs 115 may execute one or more sets of codes to control the functional elements to perform the functions described below. In other embodiments, a eNB such as one of the eNBs 105 may execute one or more sets of code to control the functional elements to perform the functions described below.

At block 1005, a transmitter sends a reference signal at a first power level and with a first predetermined pathloss value. The reference signal may be sent at a power level that is known by the devices participating in the broadcast transmissions, i.e., the receiving devices 605. The reference signal may be a pilot signal. The first predetermined pathloss value may be included in an information field, for example, and may provide information to the associated receivers to send a response to the reference signal if its pathloss value is greater than the first predetermined pathloss value. In some examples, the first predetermined pathloss value may be associated with a measured power level the receiver receives the reference signal at whereas the receiver may send a response if the received power level is at or below the first predetermined power level.

At block 1010, a response to the reference signal is not received. At block 1015, it is determined that a pathloss value for a receiver associated with the transmitter is less than a first predetermined pathloss value, the determining based at least in part on receiving no response to the reference signal from the receiver. Receiving no response may indicate that none of the receivers participating in the broadcast transmissions is experiencing a pathloss value greater than the first predetermined pathloss value. In some cases, a receiver will send no response to the reference signal if the reference signal is received at a received power level greater than a predetermined power level.

At block 1020, an information field is modified to define a second predetermined pathloss value that is less than the first predetermined pathloss value. Defining the second predetermined pathloss value may permit a more accurate determination of what the pathloss value is. For example, if the first predetermined pathloss value was 100 dBm, and failing to receive a response indicates that no receiver is experiencing pathloss greater than 100 dBm, then the second predetermined pathloss value may be selected to be 75 dBm to ascertain whether the pathloss is between 75 dBm and 100 dBm. As such, a more narrow accuracy range of pathloss determination can be determined.

At block 1025, the reference signal is re-sent with the second predetermined pathloss value. The reference signal can be re-sent at the same fixed or known power level as the first transmission. At block 1030, it is determined whether pathloss value for a receiver associated with the transmitter is greater than the second predetermined pathloss value, the determining based at least in part on whether a response to the reference signal is received. Continuing with the example, if a receiver is experiencing pathloss greater than 75 dBm, the receiver may send a response to the reference signal. If no receiver is experiencing pathloss greater than 75 dBm, then no response to the reference signal is sent.

Thus, the method 1000 may provide for determining pathloss for a receiver. It should be noted that the method 1000 is just one implementation and that the operations of the method 1000 may be rearranged or otherwise modified such that other implementations are possible. In some examples, the operations at blocks 1005, 1010, 1015, 1020, 1025 and 1030 may be performed by the pathloss management module 215 described with reference to FIGS. 2, 3, 4, and/or 5.

Figure 11:
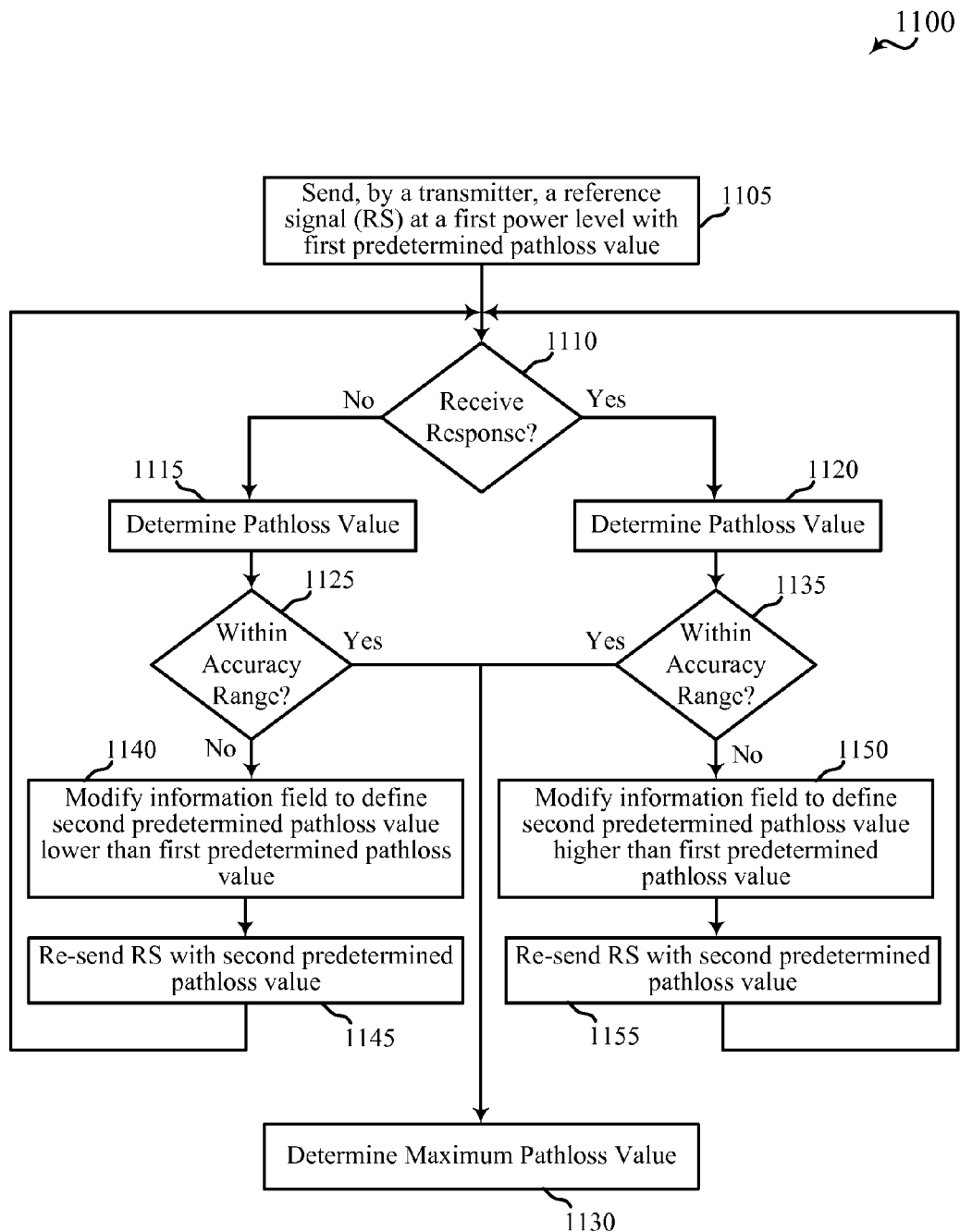

FIG. 11 is a flow chart illustrating an example of a method 1100 for determining pathloss in a wireless communication system, in accordance with various aspects of the present disclosure. For clarity, the method 1100 is described below with reference to aspects of one or more of the UEs 115, the devices 205, and/or the apparatus 505 described with reference to FIGS. 1, 2, 3, 4, 5, 6, and/or 7. In some embodiments, a UE such as one of the UEs 115 may execute one or more sets of codes to control the functional elements to perform the functions described below. In other embodiments, a eNB such as one of the eNBs 105 may execute one or more sets of code to control the functional elements to perform the functions described below.

At block 1105, a transmitter sends a reference signal at a first power level and with a first predetermined pathloss value. The reference signal may be sent at a power level that is known by the devices participating in the broadcast transmissions, i.e., the receiving devices 605. The reference signal may be a pilot signal. The first predetermined pathloss value may be included in an information field, for example, and may provide information to the associated receivers to send a response to the reference signal if its pathloss value is greater than the first predetermined pathloss value. In some examples, the first predetermined pathloss value may be associated with a measured power level the receiver receives the reference signal at whereas the receiver may send a response if the received power level is at or below the first predetermined power level. By way of example only, the first predetermined pathloss value may be 100 dBm.

At block 1010, it is determined whether a response to the reference signal is received from at least one of the associated receivers participating in the broadcast transmission.

If a response to the reference signal is not received, at block 1115 it is determined that the pathloss is less than the first predetermined pathloss value. The determining may be based at least in part on receiving no response to the reference signal from a receiver. Receiving no response may indicate that none of the receivers participating in the broadcast transmissions is experiencing a pathloss value greater than the first predetermined pathloss value. In some cases, a receiver will send no response to the reference signal if the reference signal is received at a received power level greater than a predetermined power level.

At block 1125, it is determined whether the pathloss value has been determined to within a predefined accuracy range, e.g., ±3 dB. If the pathloss has been determined to within the predefined accuracy range, the method 1100 moves to block 1130 where the determined pathloss value is determined to be the maximum pathloss value. If the pathloss value is not within the predefined degree of accuracy, at block 1140 an information field is modified to define a second predetermined pathloss value that is less than the first predetermined pathloss value. Defining the second predetermined pathloss value may permit a more accurate determination of what the pathloss value is. Continuing with the example, if the first predetermined pathloss value was 100 dBm, and failing to receive a response indicates that no receiver is experiencing pathloss greater than 100 dBm, then the second predetermined pathloss value may be selected to be 75 dBm to ascertain whether the pathloss is between 75 dBm and 100 dBm. As such, a more narrow accuracy range of pathloss determination can be determined.

At block 1145, the reference signal is re-sent with the second predetermined pathloss value. The reference signal can be re-sent at the same fixed or known power level as the first transmission. The method 1100 then returns to block 1110 where it is determined whether a response to the re-sent reference signal having the second predetermined pathloss value is received.

Returning to the description of the first transmission of the reference signal with the first predetermined pathloss value, if a response to the reference signal is received, at block 1120 it is determined that the pathloss is greater than the first predetermined pathloss value. The determining may be based at least in part on receiving the response to the reference signal from a receiver. Receiving the response may indicate that at least one of the receivers participating in the broadcast transmissions is experiencing a pathloss value greater than the first predetermined pathloss value. In some cases, a receiver will send a response to the reference signal if the reference signal is received at a received power level less than a predetermined power level.

At block 1135, it is determined whether the pathloss value has been determined to within a predefined accuracy range, e.g., ±3 dB. If the pathloss has been determined to within the predefined accuracy range, the method 1100 moves to block 1130 where the determined pathloss value is determined to be the maximum pathloss value. If the pathloss value is not within the predefined degree of accuracy, at block 1150 an information field is modified to define a second predetermined pathloss value that is greater, in this instance, than the first predetermined pathloss value. Defining the second predetermined pathloss value may permit a more accurate determination of what the pathloss value is. Continuing with the example, if the first predetermined pathloss value was 100 dBm, and receiving a response indicates that at least one receiver is experiencing pathloss greater than 100 dBm, then the second predetermined pathloss value may be selected to be 125 dBm to ascertain whether the pathloss is between 100 dBm and 125 dBm. As such, a more narrow accuracy range of pathloss determination can be determined.

At block 1155, the reference signal is re-sent with the second predetermined pathloss value. The reference signal can be re-sent at the same fixed or known power level as the first transmission. The method 1100 then returns to block 1110 where it is determined whether a response to the re-sent reference signal having the second predetermined pathloss value is received.

As can be seen from the above description, the method 1100 may provide for an iterative approach to determine the maximum pathloss to within a predefined range of accuracy. The method 1100 may be employed to continually modify the information field until the maximum pathloss is determined. As one example, the predetermined pathloss value (PPV) may be selected to be 100 dBm ($1^{st}$ PPV), 75 dBm ($2^{nd}$ PPV when no response received to $1^{st}$ PPV), 50 dBm ($3^{rd}$ PPV when no response received to $2^{nd}$ PPV), 63 dBm ($4^{th}$ PPV when a response received to $3^{rd}$ PPV), 57 dBm ($5^{th}$ PPV when no response received to $4^{th}$ PPV) and so on until the predefined degree of accuracy is reached. As another example, the PPV may be selected to be 85 dBm ($1^{st}$ PPV), 100 dBm ($2^{nd}$ PPV when a response is received to $1^{st}$ PPV), 93 dBm ($3^{rd}$ PPV when no response received to $2^{nd}$ PPV), 89 dBm ($4^{th}$ PPV when no response is received to $3^{rd}$ PPV), 87 dBm ($5^{th}$ PPV when no response received to $4^{th}$ PPV). In this second example, the maximum pathloss has been determined to within 2 dB of accuracy.

The steps of the method 1100 for the different predetermined pathloss values may be spread over time, as long as the user geometry is not changing rapidly. Since the number of measurements is independent of the number of broadcast receivers and grows only logarithmically with the dynamic range of the maximum pathloss, there is minimal measurement overhead in the method 1100.

Thus, the method 1100 may provide for determining a maximum pathloss for a receiver to within a predefined range of accuracy. It should be noted that the method 1100 is just one implementation and that the operations of the method 1100 may be rearranged or otherwise modified such that other implementations are possible. In some examples, the operations at blocks 1105, 1110, 1115, 1120, 1125, 1130, 1135, 1140, 1145, 1150, and 1155 may be performed by the pathloss management module 215 described with reference to FIGS. 2, 3, 4, and/or 5.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for wireless communications, comprising:
sending, by a transmitter, a reference signal at a first power level, wherein the reference signal comprises an information field associated with a first predetermined pathloss value;
determining, by the transmitter, that a pathloss value for a receiver associated with the transmitter is lower than the first predetermined pathloss value, the determining based at least in part on a failure to receive a response to the reference signal from the receiver, wherein the failure to receive the response to the reference signal indicates that the receiver received the reference signal at a received power level above a threshold level;
modifying the information field associated with the first predetermined pathloss value based on the failure to receive the response, wherein modifying the information field comprises identifying a second predetermined pathloss value, the second predetermined pathloss value being lower than the first predetermined pathloss value;
re-sending, by the transmitter, the reference signal at the first power level, the reference signal comprising the modified information field associated with the second predetermined pathloss value;
determining whether the pathloss value for the receiver is greater than the second predetermined pathloss value based at least in part on whether a response to the reference signal is received; and
transmitting a signal at a transmission power based at least in part on the determining that the pathloss value for the receiver is greater than the second predetermined pathloss value.

2. The method of claim 1, further comprising:
repeating, iteratively, the modifying, re-sending, and determining steps until a response is received from the receiver; and
determining a maximum pathloss value for the receiver based at least in part on receiving the response.

3. The method of claim 1, further comprising:
determining that the pathloss value for the receiver is higher than the first predetermined pathloss value based on receiving a response from the receiver.

4. The method of claim 3, further comprising:
modifying the information field associated with the first predetermined pathloss value based on receiving the response, wherein modifying the information field identifies a third predetermined pathloss value, the third predetermined pathloss value being higher than the first predetermined pathloss value;
re-sending, by the transmitter, the reference signal at the first power level, the reference signal comprising the modified information field associated with the third predetermined pathloss value; and
determining whether the pathloss value for the receiver is greater than the third predetermined pathloss value based on whether a response to the reference signal is received.

5. The method of claim 4, further comprising:
repeating, iteratively, the modifying, re-sending, and determining steps until no response is received from the receiver; and
determining a maximum pathloss value for the receiver based at least in part on a failure to receive a response.

6. The method of claim 1, wherein a response from the receiver indicates that the receiver received the reference signal at a received power level below a threshold power level.

7. The method of claim 1, wherein a response from the receiver is received via a channel common to all receivers associated with the transmitter.

8. The method of claim 1, further comprising:
determining a maximum pathloss for the receiver by iteratively repeating the sending and determining steps.

9. An apparatus for wireless communications, comprising:
a processor;
memory in electronic communication with the processor; and
instructions stored in the memory, the instructions being executable by the processor to:
send, by a transmitter, a reference signal at a first power level, wherein the reference signal comprises an information field associated with the first predetermined pathloss value;
determine, by the transmitter, that a pathloss value for a receiver associated with the transmitter is lower than the first predetermined pathloss value, the determining based at least in part on a failure to receive a response to the reference signal from the receiver, wherein the failure to receive the response to the reference signal indicates that the receiver received the reference signal at a received power level above a threshold level;
modify the information field associated with the first predetermined pathloss value based on the failure to receive the response, wherein modifying the information field comprises identifying a second predetermined pathloss value, the second predetermined pathloss value being lower than the first predetermined pathloss value;
re-send, by the transmitter, the reference signal at the first power level, the reference signal comprising the modified information field associated with the second predetermined pathloss value;
determine whether the pathloss value for the receiver is greater than the second predetermined pathloss value based at least in part on whether a response to the reference signal is received; and
transmit a signal at a transmission power based at least in part on the determining that the pathloss value for the receiver is greater than the second predetermined pathloss value.

10. The apparatus of claim 9, further comprising instructions executable by the processor to:
repeat, iteratively, the modifying, re-sending, and determining steps until a response is received from the receiver; and
determine a maximum pathloss value for the receiver based at least in part on receiving the response.

11. The apparatus of claim 9, further comprising instructions executable by the processor to:

determine that the pathloss value for the receiver is higher than the first predetermined pathloss value based on receiving a response from the receiver.

12. The apparatus of claim 11, further comprising instructions executable by the processor to:
modify the information field associated with the first predetermined pathloss value based on receiving the response, wherein modifying the information field identifies a third predetermined pathloss value, the third predetermined pathloss value being lower than the first predetermined pathloss value;
re-send, by the transmitter, the reference signal at the first power level, the reference signal comprising the modified information field associated with the third predetermined pathloss value; and
determine whether the pathloss value for the receiver is greater than the second predetermined pathloss value based on whether a response to the reference signal is received.

13. The apparatus of claim 12, further comprising instructions executable by the processor to:
repeat, iteratively, the modifying, re-sending, and determining steps until no response is received from the receiver; and
determine a maximum pathloss value for the receiver based at least in part on a failure to receive a response.

14. The apparatus of claim 9, further comprising instructions executable by the processor to:
determine a maximum pathloss for the receiver by iteratively repeating the sending and determining steps.

15. An apparatus for wireless communications, comprising:
means for sending, by a transmitter, a reference signal at a first power level, wherein the reference signal comprises an information field associated with a first predetermined pathloss value;
means for determining, by the transmitter, that a pathloss value for a receiver associated with the transmitter is lower than the first predetermined pathloss value, the determining based at least in part on a failure to receive a response to the reference signal from the receiver, wherein the failure to receive the response to the reference signal indicates that the receiver received the reference signal at a received power level above a threshold level;
means for modifying the information field associated with the first predetermined pathloss value based on the failure to receive the response, wherein modifying the information field comprises identifying a second predetermined pathloss value, the second predetermined pathloss value being lower than the first predetermined pathloss value;
means for re-sending, by the transmitter, the reference signal at the first power level, the reference signal comprising the modified information field associated with the second predetermined pathloss value;
means for determining whether the pathloss value for the receiver is greater than the second predetermined pathloss value based at least in part on whether a response to the reference signal is received; and
means for transmitting a signal at a transmission power based at least in part on the determining that the pathloss value for the receiver is greater than the second predetermined pathloss value.

16. The apparatus of claim 15, further comprising:
means for repeating, iteratively, the modifying, re-sending, and determining steps until a response is received from the receiver; and
means for determining a maximum pathloss value for the receiver based at least in part on receiving the response.

17. The apparatus of claim 15, further comprising:
means for modifying the information field associated with the first predetermined pathloss value based on receiving a response, wherein modifying the information field identifies a third predetermined pathloss value, the third predetermined pathloss value being lower than the first predetermined pathloss value;
means for re-sending, by the transmitter, the reference signal at the first power level, the reference signal comprising the modified information field associated with the third predetermined pathloss value; and
means for determining whether the pathloss value for the receiver is greater than the second predetermined pathloss value based on whether a response to the reference signal is received.

18. A non-transitory computer-readable medium storing instructions executable by a processor to:
send, by a transmitter, a reference signal at a first power level, wherein the reference signal comprises an information field associated with a first predetermined pathloss value;
determine, by the transmitter, that a pathloss value for a receiver associated with the transmitter is lower than the first predetermined pathloss value, the determining based at least in part on a failure to receive a response to the reference signal from the receiver, wherein the failure to receive the response to the reference signal indicates that the receiver received the reference signal at a received power level above a threshold power level;
modify the information field associated with the first predetermined pathloss value based on the failure to receive the response, wherein modifying the information field comprises identifying a second predetermined pathloss value, the second predetermined pathloss value being lower than the first predetermined pathloss value;
re-send, by the transmitter, the reference signal at the first power level, the reference signal comprising the modified information field associated with the second predetermined pathloss value;
determine whether the pathloss value for the receiver is greater than the second predetermined pathloss value based at least in part on whether a response to the reference signal is received; and
transmit a signal at a transmission power based at least in part on the determining that the pathloss value for the receiver is greater than the second predetermined pathloss value.

* * * * *